2 Sheets—Sheet 1.

J. WERNER, Jr.

HARVESTER.

No. 7,053. Reissued April 11, 1876.

Witnesses:
L. M. Harris.
Henrich L. Bruns.

John Werner, Jr.
Inventor.
By Coburn & Thacher
Attys.

N. PETERS, PHOTO-LITHOGRAPHER, WASHINGTON, D. C.

2 Sheets—Sheet 2.

J. WERNER, Jr.

HARVESTER.

No. 7,053.

Reissued April 11, 1876.

Witnesses:
L. M. Harris.
Heinrich F. Bruns.

John Werner, Jr.
Inventor.

By Coburn & Thacher
Attys

N. PETERS, PHOTO-LITHOGRAPHER, WASHINGTON, D. C.

UNITED STATES PATENT OFFICE.

JOHN WERNER, JR., OF PRAIRIE DU SAC, WISCONSIN.

IMPROVEMENT IN HARVESTERS.

Specification forming part of Letters Patent No 151,328, dated May 26, 1874; reissue No. 7,053, dated April 11, 1876; application filed February 17, 1876.

*To all whom it may concern:*

Be it known that I, JOHN WERNER, Jr., of Prairie du Sac, in the county of Sauk and State of Wisconsin, have invented a new and useful Improvement in Harvesters, of which the following is a full, clear, and exact description, reference being had to the accompanying drawings, making a part of this specification, in which—

Figures 1, 2:
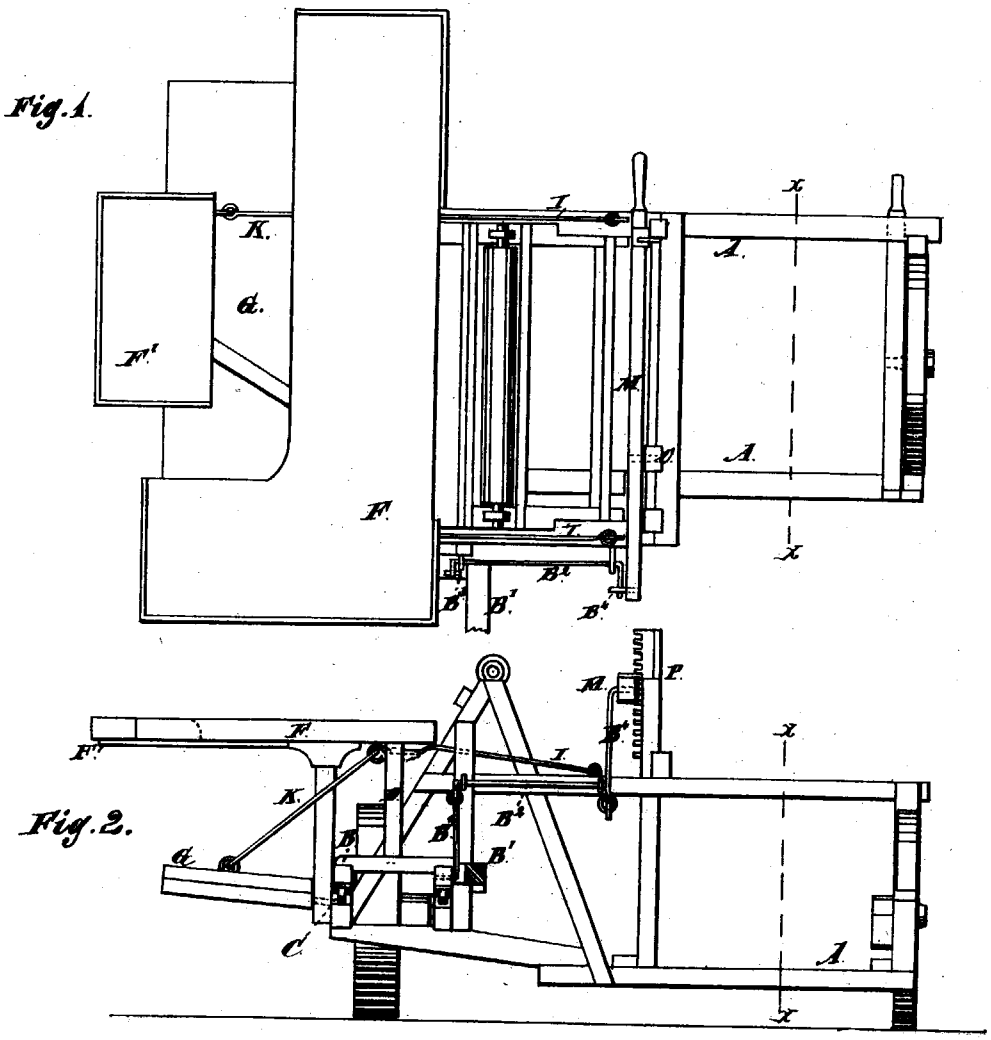
Figure 3:
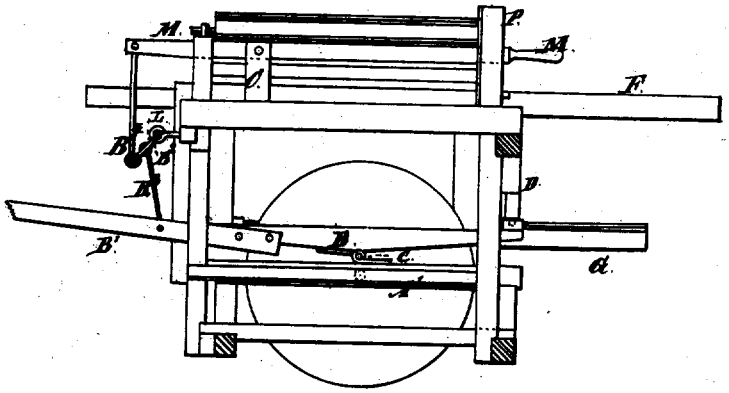
Figure 4:
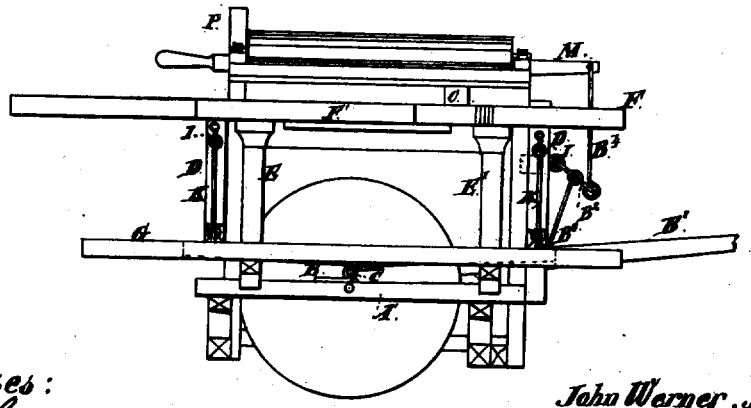

Figure 1 is a plan view of so much of a harvester as is necessary to illustrate my invention. Fig. 2 is a front elevation of the machine and a section of the tongue. Fig. 3 is a sectional elevation taken on the line *xx* of Figs. 1 and 2; and Fig. 4 is an end elevation, looking from the stubble side of the machine.

This invention relates particularly to that class of harvesting-machines having an elevated side delivery of the cut grain to binders, who ride upon the harvester and bind the grain while the machine is in operation.

Heretofore machines of this class have been so constructed that the grain-receiver, binders' tables, and binders' platform were tilted or thrown out of their proper level whenever the cutters were raised or lowered for cutting high or low, causing great inconvenience and discomfort to the binders by throwing them out of their proper positions.

The object of my invention is to remedy this evil; and it consists in applying to the harvester a supplemental frame, which carries the grain-receiver, binders' tables, and binders' platform, independent of the elevator and main frame, and is hinged to the wheel or carrying frame, so that the attendant may raise and lower the cutters without throwing the grain-receiver or the binders' platform and tables out of their proper level.

In the drawings, A represents the platform-frame, on which, in a working machine, the cutters and grain-carrier are mounted. A′ represents the wheel-frame, supported near its outer end on the axis of the driving-wheel, which is attached to the frame by suitable bearings. The inner end of the wheel-frame is connected to the platform-frame, and together they constitute, practically, but one frame. On these two frames are mounted the elevator and the other necessary frame-work, which, when taken together, I shall, for convenience, call the "main frame." In a working machine the elevator is provided with suitable appliances to properly elevate and deliver the cut grain upon the elevated grain-receiver in good order for the binders, and, in common with the cutters and grain-carrier, is driven in any suitable manner from the driving-wheel. B is a supplemental frame, which is hinged to the wheel-frame at C, on the stubble side of the elevator, at or near the axis of the driving-wheel, and extends in front and rear thereof, in order to provide for a front and rear support for its attachments, so as to equalize the weight and render easy the tilting of the cutters. $B^1$ is the tongue, which should be attached to the supplemental frame, so as to permit the wheel or main frame to be tilted independently of the supplemental frame. $B^2$ is a cranked shaft, connected to the main frame by suitable bearings, and $B^3$ is a link that connects the outer end of the cranked shaft to the supplemental frame. A link, $B^4$, connects the inner end of the cranked shaft to the short arm of the tilting-lever M, which is pivoted to the main frame at O, and extends to the rear of it, near the driver's seat, where it may be shifted up and down along a locking-rack, P, in which it is fastened at any required point to hold the front of the wheel-frame and cutters at any height desired.

E E′ are standards, attached to the supplemental frame, one in front and one in the rear of the axis of the driving-wheel, terminating at the top in transverse bars, which provide elevated supports in both front and rear for the attachment of the elevated grain-receiver and binders' tables. The binders' platform G is attached to the standards E E′, near their lower ends, and suspended from the top of posts D, and from the main frame at H, by the rods I K. An elevated grain-receiver, F, is arranged outside of, and parallel to, the discharging end of the elevator, and is secured at each end to supports at the upper ends of standards E E′. By this arrangement the position of the receiver relatively to the binders' tables and platform is maintained independently of the elevator, which may be tilted without interfering with the proper delivery of the grain upon the receiver.

F F′ represent binders' tables, which may be of any form or arrangement desirable. The table or tables may also be attached in any convenient manner to the supplemental frame, so that their positions relatively to the binders' platform and grain-receiver are maintained independently of the elevator.

In order to enable the binders to do their work with ease, the surface of the binders' tables should be nearly or quite on a level with the surface of the grain-receiver.

The operation is as follows: The supplemental frame, resting at one point on the pivots C, and another on the neck-yoke of the team, cannot tilt; consequently the grain-receiver, binders' tables, and binders' platform, being mounted on it, will remain in the same plane in which they are adjusted, and allow the cutters and wheel-frame to be raised and lowered at the front, as desired, this motion being readily effected by the lever M and its connections with the tongue and supplemental frame, which causes the wheel-frame to turn on the hinges C whenever the lever is shifted.

Having thus described my invention, what I claim as new, and desire to secure by Letters Patent, is—

1. In a harvester having an elevated side delivery of the cut grain, a supplemental frame, upon which the grain-receiver, binders' tables, and binders' platform are mounted, and which is hinged to the wheel or carrying frame, so that the latter may be tilted and the cutting apparatus may be raised and lowered independently of the supplemental frame, substantially as and for the purposes specified.

2. The combination of the hinged supplemental frame and the tongue $B^1$, rigidly attached to the supplemental frame, and connected to the main frame by suitable mechanism for tilting the latter, substantially as and for the purposes set forth.

3. A binders' platform, G, attached to and carried by the hinged supplemental frame, and supported from the main frame by a flexible connection, substantially as described.

4. The binders' tables, arranged upon and carried by the hinged supplemental frame independently of the main frame and elevating apparatus, substantially as and for the purpose set forth.

5. An elevated grain-receiver, supported upon and carried by the hinged supplemental frame independently of the elevating apparatus, substantially as and for the purposes set forth.

6. The combination of the hinged supplemental frame and the binders' tables, supported by standards, which are mounted upon the supplemental frame, and arranged in front and rear of the axis of the driving-wheel, substantially as and for the purposes set forth.

7. The combination of a supporting-frame, carrying the cutters and elevating apparatus, and an independent supplemental frame for the binders, hinged to the carrying-frame, substantially as and for the purposes set forth.

8. The combination of a main supporting or carrying frame, to which the cutting-apparatus and elevating devices are attached, and an independent supplemental frame for the binders and binders' tables, arranged on the stubble side of the machine, and hinged to the carrying-frame at or near the axis of the drive-wheel, substantially as and for the purposes set forth.

JOHN WERNER, JR.

Witnesses:
SILAS W. CORWITH,
ANNA L. CORWITH.